(12) United States Patent
Yamaguchi

(10) Patent No.: US 10,712,650 B2
(45) Date of Patent: Jul. 14, 2020

(54) SCREEN AND PROJECTION IMAGE DISPLAY SYSTEM

(71) Applicant: Panasonic Intellectual Property Management Co., Ltd., Osaka (JP)

(72) Inventor: Hiroshi Yamaguchi, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 16/291,084

(22) Filed: Mar. 4, 2019

(65) Prior Publication Data

US 2019/0369477 A1    Dec. 5, 2019

(30) Foreign Application Priority Data

May 29, 2018  (JP) ................................ 2018-102662

(51) Int. Cl.
  *G03B 21/62*  (2014.01)
  *G03B 21/20*  (2006.01)
  *G03B 21/00*  (2006.01)

(52) U.S. Cl.
  CPC .......... *G03B 21/62* (2013.01); *G03B 21/006* (2013.01); *G03B 21/204* (2013.01); *G03B 21/2073* (2013.01)

(58) Field of Classification Search
  CPC ......... G03B 21/62; G03B 21/60; G03B 21/56
  See application file for complete search history.

(56) References Cited

U.S. PATENT DOCUMENTS

| | | | |
|---|---|---|---|
| 2006/0181769 A1 | 8/2006 | Kumasawa et al. | |
| 2011/0102688 A1 | 5/2011 | De Boer | |
| 2011/0228177 A1* | 9/2011 | Fukuda | G02F 1/133632 349/5 |
| 2014/0268069 A1* | 9/2014 | Takahashi | G03B 21/142 353/31 |
| 2016/0062223 A1* | 3/2016 | Akiyama | H04N 9/3164 353/31 |
| 2016/0366377 A1* | 12/2016 | Lim | H04N 9/3135 |

(Continued)

FOREIGN PATENT DOCUMENTS

| | | |
|---|---|---|
| JP | 2006-227581 | 8/2006 |
| JP | 2011-113068 | 6/2011 |
| JP | 2011-524997 | 9/2011 |

(Continued)

*Primary Examiner* — Ryan D Howard
(74) *Attorney, Agent, or Firm* — Wenderoth, Lind & Ponack, L.L.P.

(57) ABSTRACT

A screen that diffuses and reflects image light projected by a projector, includes an uneven half mirror structure body which includes a first transparent substrate and a semitransparent reflective layer, and a second transparent substrate bonded to the uneven half mirror structure body on the surface of the uneven shape with a transparent material. The first transparent substrate has an uneven shape on one surface of the first transparent substrate. The semitransparent reflective layer is provided on the surface of the uneven shape and configured to reflect a part of light and transmit the remaining light. One of the first transparent substrate and the second transparent substrate disposed closer to a projection side than the semitransparent reflective layer is made of a material exhibiting birefringence of less than or equal to 500 nm.

10 Claims, 8 Drawing Sheets

(56) References Cited

U.S. PATENT DOCUMENTS

2017/0082915 A1\* 3/2017 Tao .................. G03B 21/60
2017/0168294 A1 6/2017 Yamaguchi et al.

FOREIGN PATENT DOCUMENTS

| JP | 2016-95456 | 5/2016 |
| JP | 2016-109778 | 6/2016 |
| JP | 2017-111429 | 6/2017 |

\* cited by examiner

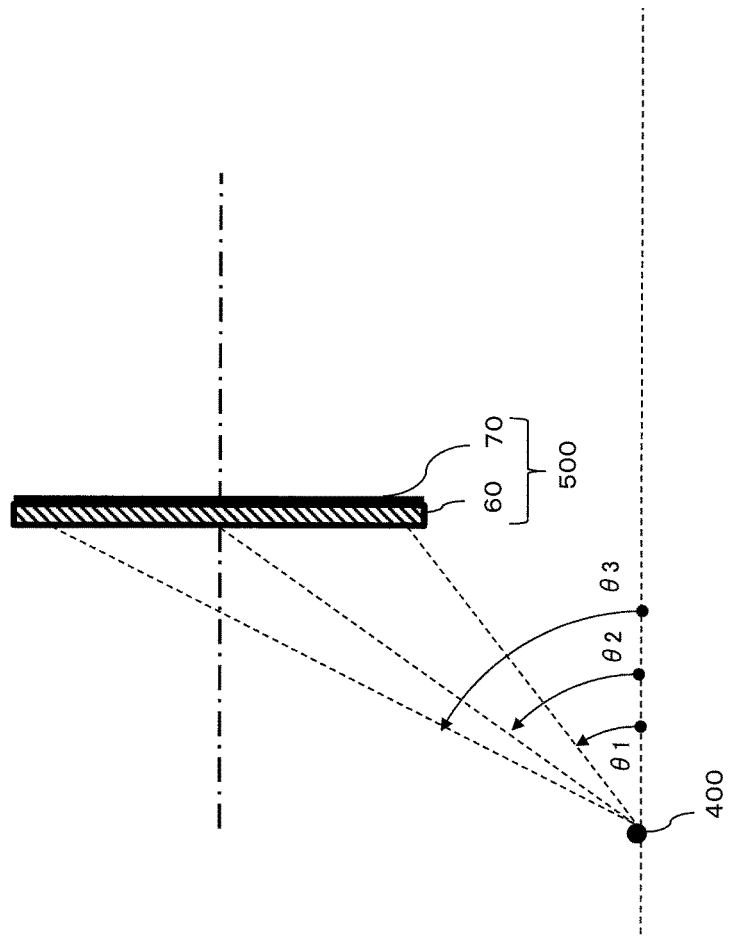

*Fig.2C* REFRACTIVE INDEX = 5000nm
*Fig.2B* REFRACTIVE INDEX = 1000nm
*Fig.2A* REFRACTIVE INDEX = 500nm

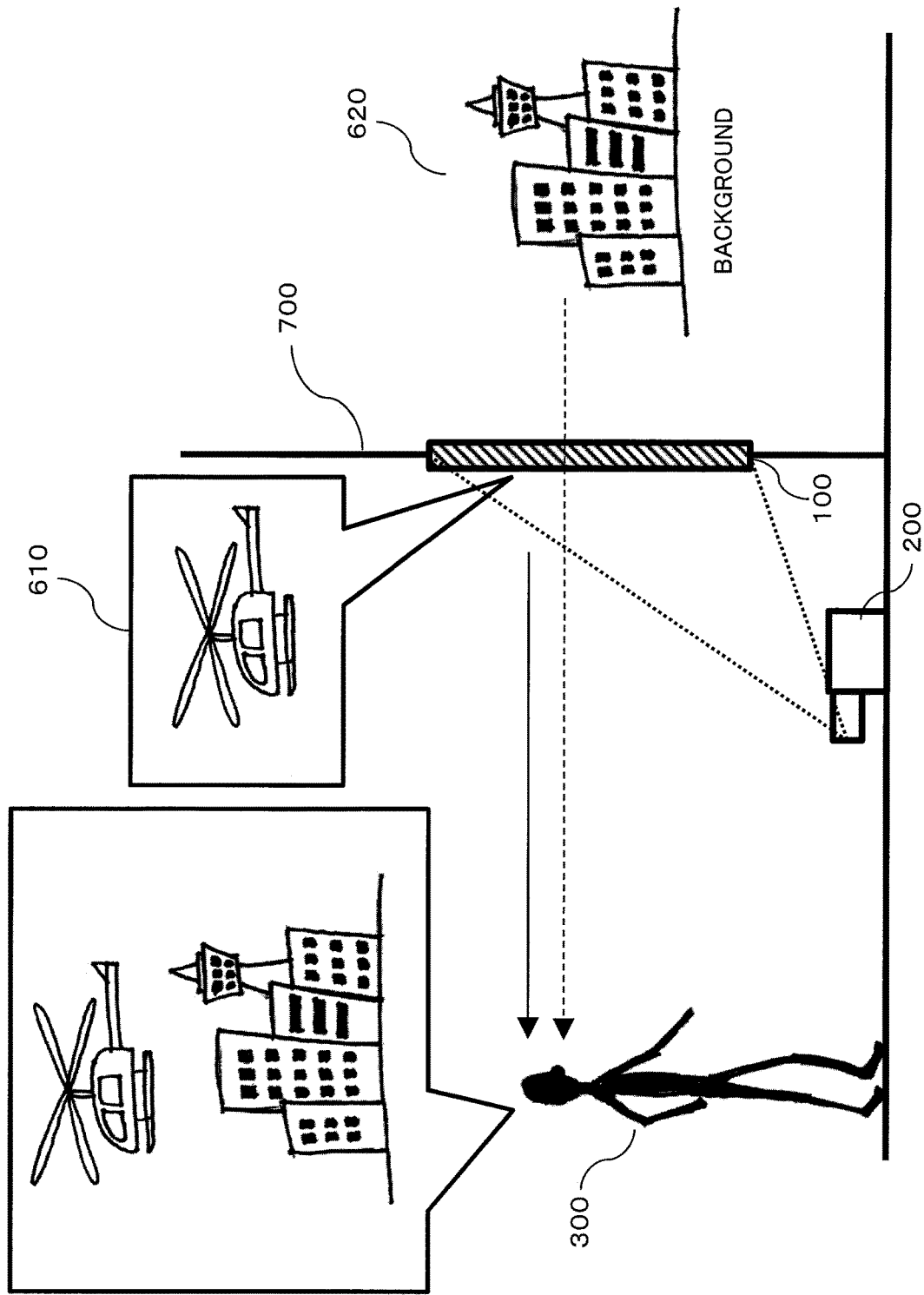

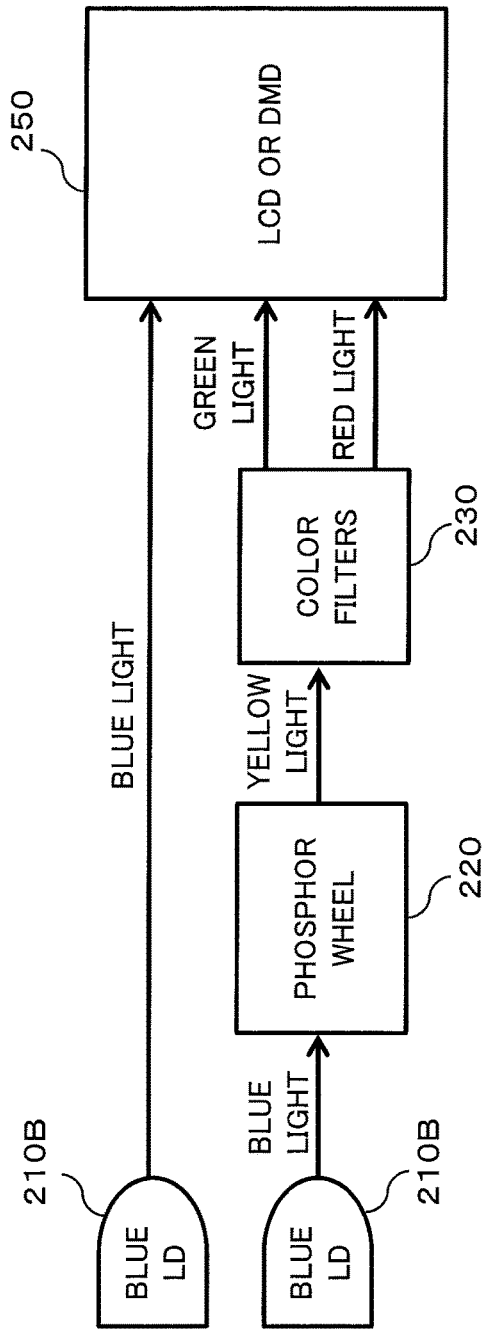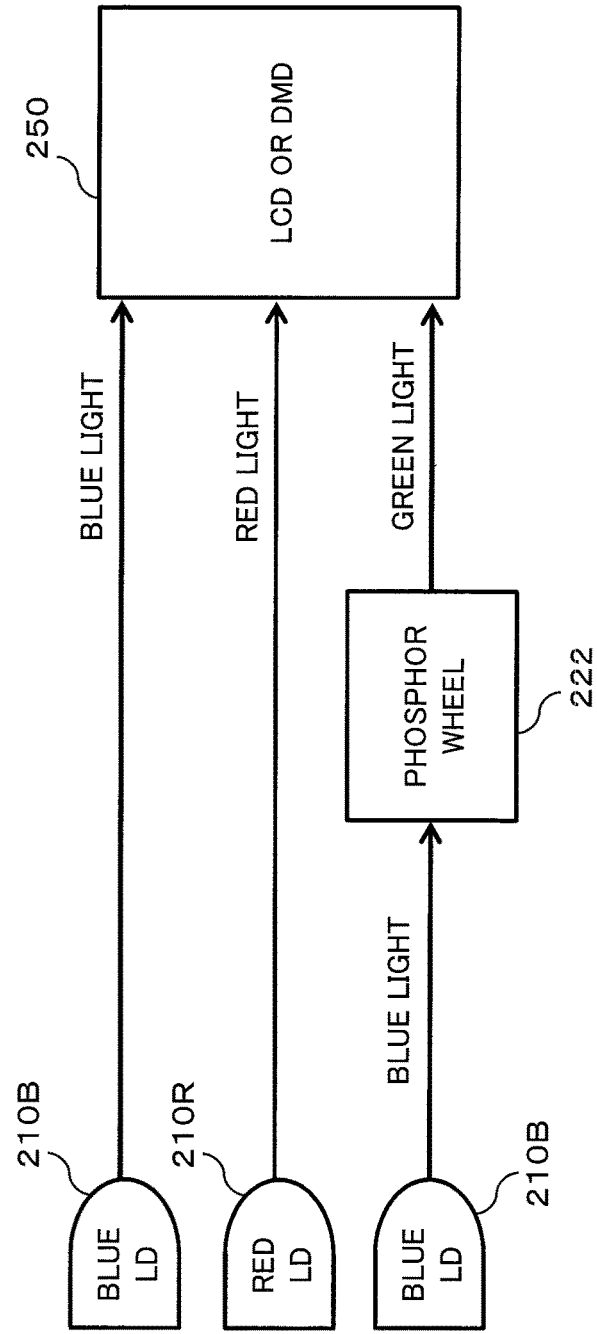
Fig.7
Fig.8

SCREEN AND PROJECTION IMAGE DISPLAY SYSTEM

BACKGROUND

1. Technical Field

The present disclosure relates to a screen that transmits background light and is capable of reflection display of an image projected by a projector or transmission display, and also relates to an image display system using the screen.

2. Related Art

In recent years, transparent screens have been proposed. The transparent screen has transparency that enables view from backside, and diffuses and reflects or diffuses and transmits an image projected by a projector to make the image visible. Such a transparent screen is disposed, for example, on a window of a high-rise building to enable a viewer to visually recognize a projected image superimposed on a night view. Alternatively, the transparent screen is used for a live event or the like to enable visual recognition as if an image is displayed in the air. As described above, new forms of projector image representation with such a transparent screen have been proposed.

For a transmissive-type transparent screen, a configuration has been proposed in which a trace amount of special diffusing particles are dispersed into a transparent body, so that part of light is largely scattered to enable an image to be visually recognized and the remaining light is linearly transmitted to make a background visible.

Scattered and transmitted light is partly reflected at an air interface on a back surface. Therefore the above-described configuration where the trace amount of diffusing particles are dispersed into the transparent body can also serve as a reflective transparent screen.

However, in principle, the configuration where diffusing particles are dispersed involves transmission and scattering, and it is difficult to achieve both bright image display and transparency to a higher degree.

Therefore, as means to achieve both image brightness and transparency to a high degree, a structure based on a reflective-type transparent screen has been proposed, in which a transparent substrate has an uneven shape on one surface thereof, a semitransparent reflective layer is provided on the surface having the uneven shape, and a surface of the semitransparent reflective layer is covered with a transparent material (see, for example, JP 2017-111429 A). According to this structure, even if a reflectance of an uneven semitransparent reflective film is increased to obtain a bright image, first-order transmitted light can travel straight without being scattered.

In practice, light diffused and reflected by the uneven semitransparent reflective film cannot be completely disappeared because transmitted and scattered light is secondarily generated by multiple reflection due to Fresnel reflection on an incident surface. However, the above method can dramatically improve the transparency as compared with a case where the same image brightness is realized with the configuration where diffusing particles are dispersed.

A projector that projects an image spatially modulates light emitted from a light source with a transmissive liquid crystal device, a reflective liquid crystal device, a digital micromirror (DMD), or the like to generate image light and forms an image on a screen surface through a projection lens to display the image.

Halogen lamps, ultra-high pressure mercury lamps, or the like have been used as light sources of such projectors, but, in recent years, highly efficient laser light sources have been developed. Such laser light sources have been widely adopted to realize projectors that have a wide color reproduction range and is easily maintained because of its excellent monochromaticity, long life and high reliability.

SUMMARY

As described above, the use of the reflective transparent screen disclosed in JP 2017-111429 A enables bright and clear image display and visual recognition of a background with high transparency, and it can be expected to realize a high presentation effect such as augmented reality.

However, some combinations of structures of reflective transparent screens and projectors may cause striped unevenness, which degrades image quality.

The present disclosure provides a screen and a projection image display system that can reduce the occurrence of striped unevenness and display a high quality image with a background made visible.

According to a first aspect of the present disclosure, a screen is provided that diffuses and reflects image light projected by a projector to display an image. The screen includes an uneven half mirror structure body including a first transparent substrate and a semitransparent reflective layer, the first transparent substrate having an uneven shape on one surface of the first transparent substrate, the semitransparent reflective layer being provided on the surface of the uneven shape and configured to reflect a part of light and transmit the remaining light, and a second transparent substrate bonded to the surface of the uneven shape of the uneven half mirror structure body with a transparent material. One of the first transparent substrate and the second transparent substrate that is disposed closer to a projection side than the semitransparent reflective layer is made of a material exhibiting birefringence of less than or equal to 500 nm.

According to a second aspect of the present disclosure, a projection image display system is provided, which includes a projector that projects image light, and the screen onto which the image light is projected.

According to the present disclosure, it is possible to reduce the occurrence of striped unevenness on the screen on which an image is projected and to display a high quality image with a background made visible.

BRIEF DESCRIPTION OF DRAWINGS

FIG. 1 is a diagram showing an optical model for simulating unevenness due to birefringence;

FIGS. 2A to 2C are diagrams showing results of simulating unevenness due to birefringence;

FIG. 3 is a diagram showing a use state of a reflective transparent screen according to each of embodiments of the present disclosure;

FIG. 7 is a diagram showing a first structure example of a light source of a projector;

FIG. 8 is a diagram showing a second structure example of the light source of the projector.

DETAILED DESCRIPTION OF PREFERRED EMBODIMENTS

Figure 4:
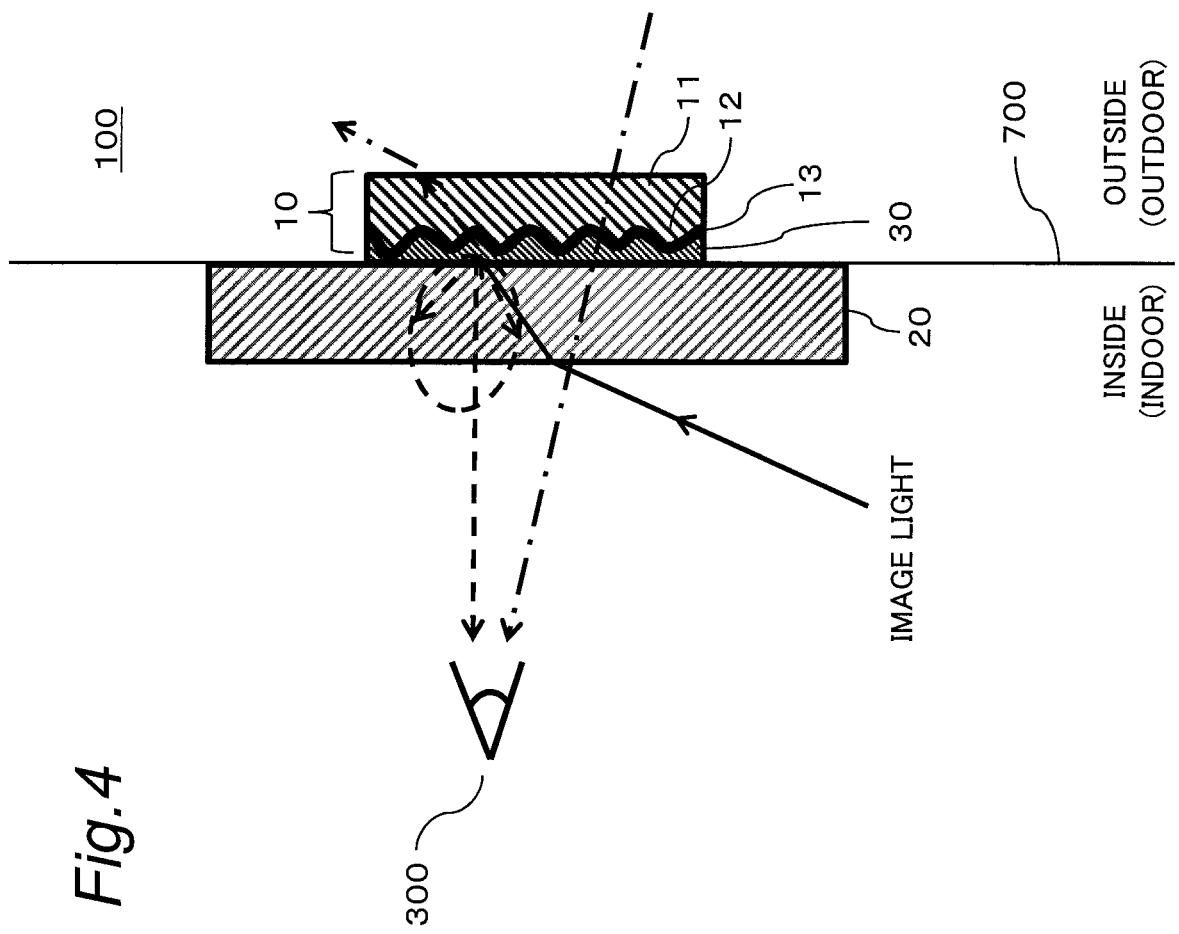
FIG. 4 is a diagram showing a structure of a reflective transparent screen according to a first embodiment.

Embodiments will be described in detail below with appropriate reference to the drawings. However, a detailed description more than necessary may be omitted. For example, a detailed description of a well-known matter and a redundant description on substantially the same structure may be omitted. This is to avoid the following description being unnecessarily redundant and to help those skilled in the art to easily understand the following description.

Note that the inventors et al. provide the attached drawings and the following description to help those skilled in the art to fully understand the present disclosure, and do not intend to use the attached drawings and the following description to limit the subject matter of the claims.

Background of the Present Disclosure

Some combinations of structures of transparent screens and projectors may cause striped unevenness, which degrades image quality. This phenomenon occurs when a liquid crystal panel is used as a spatial modulation element of a projector. Even when a DMD is used as the spatial modulation element, the phenomenon occurs when laser light is used as a light source. However, the phenomenon does not occur when a lamp is used as the light source.

Studies conducted by the inventors, et al. of the present application has resulted in findings that this phenomenon occurs when projection light having a strong polarization characteristic is incident on a semitransparent reflective film through a material having large optical anisotropy. This state has been simulated using the model as shown in FIG. 1.

In FIG. 1, a light source 400 emits linearly polarized light. A laminated body 500 considered to be a transparent screen is composed of an optically anisotropic transparent substrate 60 exhibiting birefringence and a reflective layer 70. In the model shown in FIG. 1, assuming the use of an ultra-short focus projector, incident angles θ1, θ2, and θ3 to a lower end portion, center portion, and upper end portion of the laminated body 500 considered to be the transparent screen are set to 36°, 60°, 67°, respectively.

FIGS. 2A to 2C show results of simulating, with the structure shown in FIG. 1, a pattern of a reflected image generated when linearly polarized light having a wavelength of 460 nm is incident on the laminated body 500 with uniform luminous intensity from the light source 400 for three birefringences of the optically anisotropic transparent substrate 60.

FIGS. 2A, 2B, and 2C show respective simulation results when birefringence of the optically anisotropic transparent substrate 60 is 500 nm, 1500 nm, and 5000 nm.

A lower part is brighter and an upper part is darker in each of FIGS. 2A to 2C because a point light source with uniform luminous intensity is set due to simplified modeling, and a real projector is designed to achieve almost uniform brightness. Here, take notice of unevenness occurring in a lateral direction ignoring the tendency of becoming darker from a bottom toward a top.

As is apparent from FIGS. 2A to 2C, large unevenness does not occur up to birefringence of about 500 nm. However, birefringence of 1000 nm causes obvious gradations, and birefringence of 5000 nm causes striped unevenness. From this fact, the present inventors have obtained findings that the birefringence of the optically anisotropic transparent substrate 60 is preferably less than or equal to 500 nm.

With this model, the simulation has been performed with a wavelength of 460 nm corresponding to blue light, even when the polarized light source emits red light or green light, similar unevenness having a different cycle of stripes occurs.

Thus, in a case where a projector (hereinafter, referred to as "liquid crystal projector") provided with a liquid crystal panel as a spatial modulation element is used in which each of the three primary colors exhibits polarized light, complicated rainbow-like unevenness is considered to occur.

Further, in a case where a projector provided with a DMD as a spatial modulation element is used which produce light of the three primary colors from blue light emitted from a blue laser diode, by converting the blue light to yellow light by a phosphor, and separating red light and green light by a color filter, from yellow light, only the blue light has a polarization property. For this reason, even with such a projector, striped unevenness occurs only in blue color, and, in displaying white color, striped unevenness in which a blue color and a yellow color alternately appear is likely to occur.

A transparent screen was actually produced by making a surface of a biaxially oriented film uneven, the biaxially oriented film being made of polyethylene terephthalate (hereinafter, referred to as "PET film") that is typically used as a substrate of a film-shaped optical component and exhibits large birefringence of several thousand nm and forming a semitransparent reflective film on the uneven surface to make the surface smooth. When image light was projected onto the PET film side of the transparent screen and viewed, with the liquid crystal projector, rainbow-like unevenness was viewed, while with the DMD projector using the blue laser diode and the yellow phosphor, blue and yellow striped unevenness was viewed.

The occurrence of such unevenness significantly degrades image quality and reduces a presentation effect such as viewing the image while making a background visible.

Note that, for typical reflective screens that need not be transparent, it is general that a white ink, a white pigment, a white sheet, or the like is used. Particles of any of these materials that are different from a base material in refractive index are dispersed and diffuse and reflect light by multiple scattering and multiple reflection. Even when polarized light is projected, striped unevenness does not occur because the polarized light is depolarized through the multiple scattering and multiple reflection. Thus, unevenness caused by a projector that emits polarized light is a problem unique to such a transparent screen.

A specific structure of a transparent screen for the solution to the above problem will be described below.

First Embodiment

FIG. 3 is a diagram showing a use state of a transparent screen according to each of the embodiments of the present disclosure including a first embodiment.

A reflective-type transparent screen 100 composes a projection image display system together with a projector 200 that projects an image onto the transparent screen 100. The transparent screen 100 is installed on a window 700 of a building. The transparent screen 100 reflects an image 610 projected by the projector 200 and transmits light from a background 620 outside the window 700. That is, a viewer 300 in front of the transparent screen 100 can visually recognize, on the transparent screen 100, the background 620 outside the window 700 and the image 610 projected by the projector 200 with the image 610 superimposed on the background 620.

The transparent screen 100 is a reflective-type transparent screen having reflectivity for diffusing and reflecting the image 610 projected by the projector 200 and transparency for transmitting the background 620. The transparent screen 100 diffuses and reflects a part (for example, 5% or more and 50% or less) of incident visible light and linearly transmits a part (30% or more) of the remaining light.

When there is no projection from the projector 200, the transparent screen 100 serves as a transparent body, which enables the viewer 300 to view the background 620 as in a case where only the window 700 is present. On the other hand, when the projector 200 projects the image 610, the transparent screen 100 diffuses and reflects a part of the image thus projected, which enables the viewer 300 to view not only the image 610 projected but also the background 620.

It is required that the transparent screen 100 linearly transmit light to enable the viewer 300 to clearly view the background 620, which requires a surface serving as an interface with air to be flat. Therefore, the reflection on the screen surface is specular reflection. Thus, when specular-reflected light of the image projected by the projector 200 directly enters eyes of the viewer 300, the light is too dazzling for viewer 300 to view the image. Therefore, as shown in FIG. 3, the projector 200 projects the image at a large angle onto the transparent screen 100 such that the reflected light does not directly travel toward a proper range in a front direction of the screen 100.

Further, the projector 200 is placed in the vicinity of the transparent screen 100 and projects the image 610 at a predetermined angle of elevation from obliquely below such that the image 610 projected by the projector 200 is not blocked by the viewer 300. For this reason, as the projector 200, an ultra-short focus projector having a short focal length is used. At this time, an angle of light incident on the transparent screen 100 is not less than 55° and not more than 65°, at the center portion of the transparent screen 100, while the angle is not less than 65° and not more than 75°, at the upper end portion of the transparent screen 100 with respect to a normal direction of the transparent screen 100, for example.

Visibility of the image 610 reflected by the transparent screen 100 varies depending on conditions such as brightness of the background. When the background is bright due to, for example, the daytime, it becomes difficult for the transparent screen 100 to display the projected image with high contrast, and the visibility of the background 620 becomes higher. Thus, when the background is bright, the transparent screen 100 mainly functions as displaying information and the like.

On the other hand, when the background is dim due to, for example, the evening time, the transparent screen 100 can display the image with high contrast, which enables a fantastic presentation with the superimposition of the projected image 610 on the background 620.

Furthermore, when the background is dark due to, for example, the night time, almost only the image is displayed, so that it is possible to enjoy the image with high contrast and high sharpness as with a normal display apparatus.

FIG. 4 is a diagram showing a specific structure of the transparent screen 100 of reflective type according to the first embodiment.

The transparent screen 100 includes an uneven half mirror structure body 10 and a second transparent substrate 20. The second transparent substrate 20 is made of a material exhibiting birefringence of less than or equal to 500 nm. The second transparent substrate 20 is made of glass. In the present embodiment, the second transparent substrate 20 is a flat window glass.

The uneven half mirror structure body 10 and the second transparent substrate 20 are bonded together with a transparent adhesive 30. The uneven half mirror structure body 10 includes a first transparent substrate 11. An uneven layer 12 is provided on a surface of the first transparent substrate 11. A semitransparent reflective layer 13 is formed on a surface of the uneven layer 12 opposite to the first transparent substrate 11.

The image light from the projector 200 is projected onto the second transparent substrate 20 of the transparent screen 100. That is, an exposed surface of the second transparent substrate 20 serves as a projection surface. Part of the image light projected by the projector 200 onto the transparent screen 100 is diffused and reflected as indicated by a solid arrow and visually recognized as an image by the viewer 300.

When an image was projected onto the transparent screen 100 having such a structure by a liquid crystal, projector or a DMD projector using a blue laser as a light source, a high quality image without striped unevenness was visually recognized. This is because the window glass made of optical glass generally has excellent optical isotropy and exhibits birefringence of as small as about several nm.

The structure as shown in FIG. 4 in which the uneven half mirror structure body 10 is disposed on a surface of the second transparent substrate 20 which is a window glass, with the surface being opposite to the projection surface. This structure prevents the viewer 300 from coming into contact with the uneven half mirror structure body 10. Accordingly, such a transparent screen 100 is applicable to, for example, a show window, and is useful for, for example, a presentation to display exhibited items which are superimposed on an advertisement image.

Note that, in such a case, since the first transparent substrate 11 that is a part of the uneven half mirror structure body 10 does not affect the formation of a reflected image, the first transparent substrate 11 needs not have particularly high isotropy and only needs to have basic optical characteristics such as high transparency and stable physical properties. Accordingly, for example, a typical PET film can be used as the substrate of the film-shaped optical component constituting the first transparent substrate 11.

Second Embodiment

In a case where reflective-type transparent screens are formed on windows of a high-rise apartment building for a viewer to enjoy a background such as night view together with an image display, the formation of the uneven half mirror structure body 10 on an outer side of the window, that is, outside the building, as described in the first embodiment causes the characteristics of the transparent screen to significantly deteriorate due to, for example, wind and rain, and sunlight, and also makes maintenance difficult. For this reason, it is preferable that the uneven half mirror structure body 10 be disposed on a viewer's side, that is, inside the building. In the present embodiment, a structure of a transparent screen in which the uneven half mirror structure 10 is disposed indoors will be described.

Figure 5:
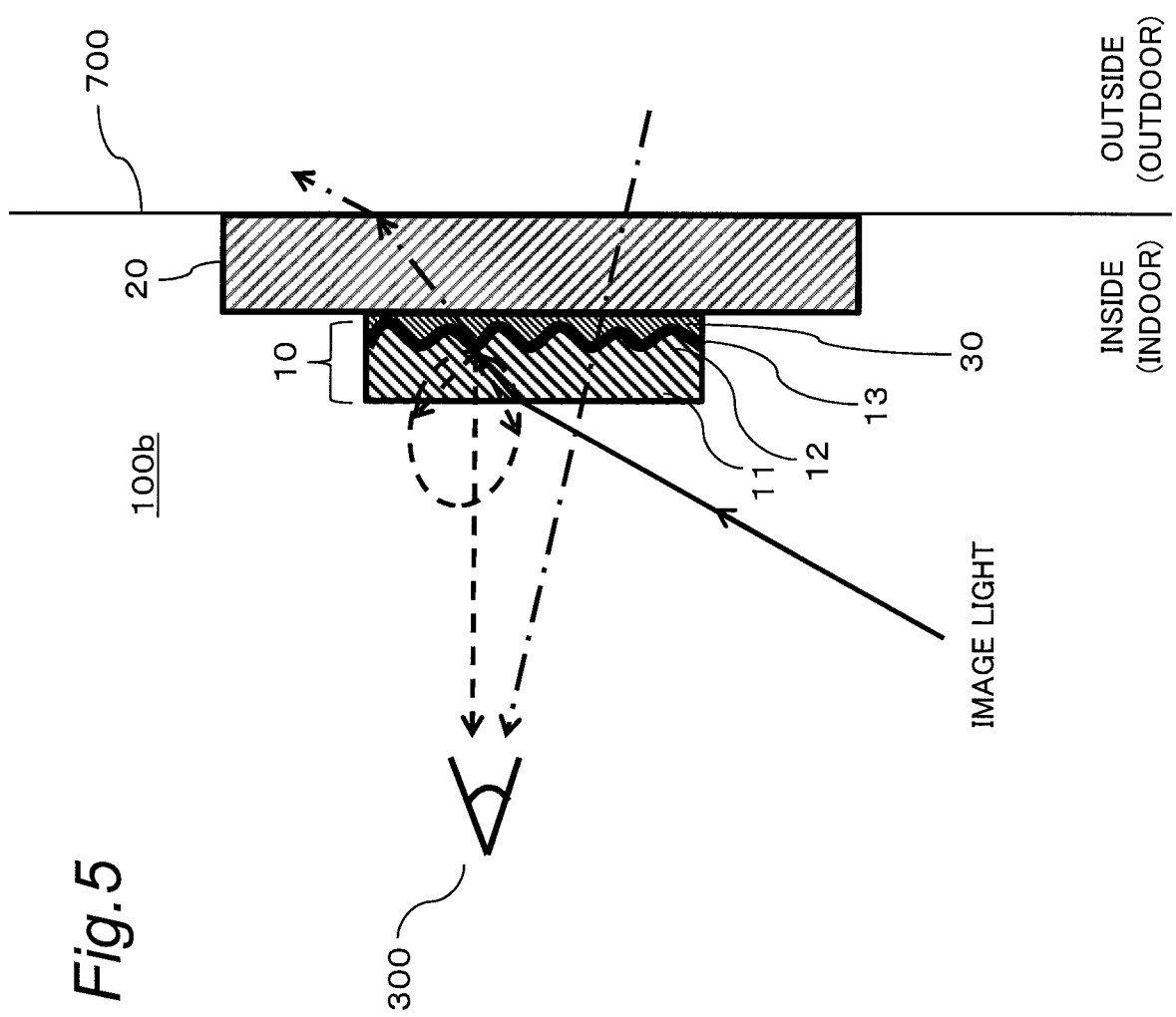
FIG. 5 is a diagram showing a structure of a reflective transparent screen according to a second embodiment.

FIG. 5 is a diagram showing a structure of a reflective type transparent screen 100b according to a second embodiment of the present disclosure. The transparent screen 100b shown in FIG. 5 has the same structure as the structure of the transparent screen 100 according to the first embodiment.

The transparent screen 100b according to the present embodiment is different from the transparent screen 100 according to the first embodiment in that the uneven half mirror structure body 10 is disposed on an inner side of the window 700 (indoor side). Image light is projected by the projector 200 onto the first transparent substrate 11 of the transparent screen 100b. That is, a surface of the first transparent substrate 11 serves as a projection surface. The first transparent substrate 11 is made of a material exhibiting birefringence of less than or equal to 500 nm.

Further, in the transparent screen 100b, an acrylic film made of polymethyl methacrylate (PMMA) to which a trace amount of rubber is added and formed into a film shape with a thickness of 75 µm is used as the first transparent substrate 11 of the uneven half mirror structure body 10.

PMMA is known as a material excellent in optical isotropy. The birefringence of the first transparent substrate 11 according to the present embodiment is as small as about 2 nm.

When an image was projected onto the transparent screen 100b having such a structure by a liquid crystal projector or a DMD projector using a blue laser as a light source, a high quality image without striped unevenness was visually recognized.

Third Embodiment

As described above, PET is the most common material as the substrate of the film-shaped optical component. It is expected to use, for example, a widely available ready-made diffusion film or microlens array film that is a PET substrate in order to make the uneven half mirror structure body 10 that is excellent in stability of a scattering characteristic and is relatively inexpensive.

In a case where it is necessary to form the uneven half mirror structure body 10 on an inner side of the window as in the case where the uneven half mirror structure body 10 is provided on the window facing outdoors in the second embodiment, the structure as shown in FIG. 5 causes image light projected by a projector to travel back and forth within a PET film that exhibits large birefringence. When an image is projected onto such a transparent screen by a projector such as a liquid crystal projector that emits polarized light, noticeable rainbow unevenness occurs.

Figure 6:
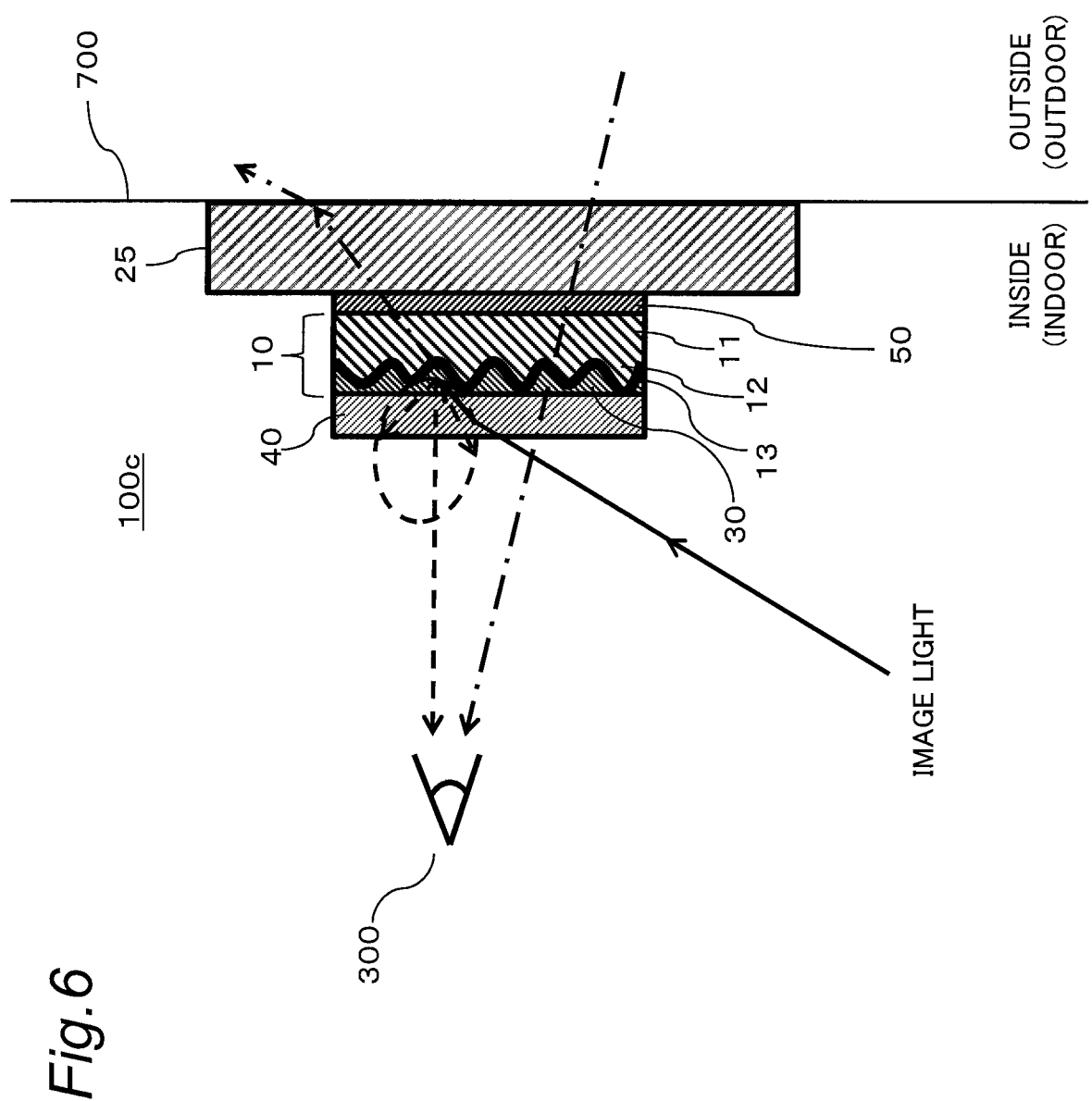
FIG. 6 is a diagram showing a structure of a reflective transparent screen according to a third embodiment.

In the present embodiment, a structure of a transparent screen to solve such a problem will be described. FIG. 6 shows a structure of a reflective type transparent screen 100c according to the present embodiment. In the transparent screen 100c according to the present embodiment, the uneven half mirror structure body 10 using the first transparent substrate 11 that exhibits large birefringence is disposed on an inner side of the window 700.

In the reflective type transparent screen 100c shown in FIG. 6, the uneven half mirror structure body 10 including the first transparent substrate 11 made of PET and a second transparent substrate 40 made of an acrylic film are bonded together with the transparent adhesive 30. With this structure, a structure body including the uneven half mirror structure body 10 and the second transparent substrate 40 serves as a reflective transparent screen. However, the structure body including the uneven half mirror structure body 10 and the second transparent substrate 40 has a film shape and cannot be mechanically self-supported. For this reason, the structure body including the uneven half mirror structure body 10 and the second transparent substrate 40 is bonded to a window glass 25 with the transparent adhesive 50.

The transparent screen 100c shown in FIG. 6 further includes the second transparent substrate 40 and a layer of the transparent adhesive 50 in addition to the components of the transparent screen 100b shown in FIG. 5.

However, the first transparent substrate 11 having an uneven shape of the uneven half mirror structure body 10 is an important element that determines a reflection and scattering characteristic of a reflective-type transparent screen. Thus, a PET substrate film that is widely available, excellent in characteristic stability, and inexpensive is used for the first transparent substrate 11. Accordingly, it is expected to realize a reflective-type transparent screen that is excellent in characteristic stability and inexpensive. The first transparent substrate 11 is made of a material exhibiting birefringence of greater than 500 nm, for example.

The second transparent substrate 40 is made of a material exhibiting birefringence of less than or equal to 500 nm, for example. Specifically, as a material of the second transparent substrate 40, other than an acrylic film, there is a triacetyl cellulose (TAC) film, a polycarbonate film, or the like. These films can be used as the second transparent substrate 40 and are stably available at relatively low cost.

In particular, when mass consumption with, for example, ordinary consumer products cannot be expected, producing exclusively an uneven transparent substrate may cause a large material loss.

When an image was projected onto the transparent screen 100c having such a structure by a liquid crystal projector or a projector that uses a blue laser diode as a light source and includes a DMD, a high quality image without striped unevenness was visually recognized.

Figure 9:
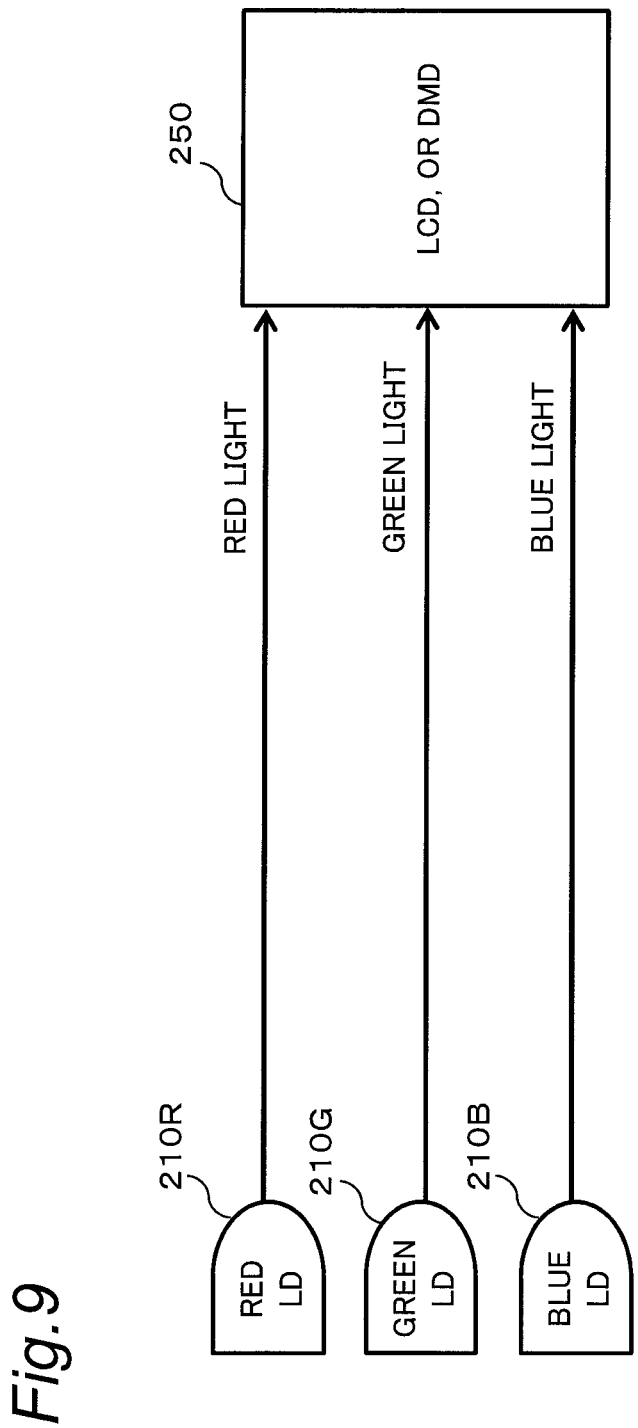
FIG. 9 is a diagram showing a third structure example of the light source of the projector.

FIGS. 7 to 9 are diagrams showing examples of a configuration of the light source of the projector 200 according to the first to third embodiments. The light source generates light of three primary colors (red, green, and blue) and outputs the light to a spatial modulation element 250. The spatial modulation element 250 generates image light representing an image to be projected onto the transparent screens 100 to 100c. The spatial modulation element 250 is, for example, a liquid crystal panel or DMD.

FIG. 7 shows a first example of a configuration of the light source. In this example, the projector 200 includes a blue laser diode 210B as a light source that outputs blue light, a phosphor wheel 220 that generates yellow light from the blue light output from the blue laser diode 210B, and a color filter 230 that separates red light and green light from the yellow light. The phosphor wheel 220 includes a phosphor that generates the yellow light from the blue light by fluorescence excitation.

FIG. 8 shows a second example of a configuration of the light source. In this example, the projector 200 includes the blue laser diode 210B that outputs blue light and a red laser diode 210R that outputs red light, as light sources, and a phosphor wheel 222 that generates green light from the blue light output from the blue laser diode 210B. The phosphor wheel 222 includes a phosphor that generates the green light from the blue light by fluorescence excitation.

FIG. 9 shows a third example of a configuration of the light source. In this example, the projector 200 includes, as light sources, the red laser diode 210R that outputs red light, a green laser diode 210G that outputs green light, and the blue laser diode 210B that outputs blue light.

The structures shown in FIGS. 7 to 9 enable the light sources to generate light of RGB three primary colors.

Other Embodiments

As described above, the first to third embodiments have been described as examples of the technique disclosed in the present application. However, the technique according to the present disclosure is not limited to the embodiments and is applicable to embodiments in which changes, replacements, additions, omissions, or the like are made as appropriate. Further, it is also possible to combine the respective components described in the first to third embodiments to form a new embodiment.

Present Disclosure

The present disclosure discloses a screen and a projection image display device having the following structure.

(1) A screen (100, 100b, 100c) that diffuses and reflects image light projected by a projector to display an image, the screen including an uneven half mirror structure body (10) including a first transparent substrate (11) having an uneven shape (12) on one surface of the first transparent substrate (11) and a semitransparent reflective layer (13) that is provided on the surface of the uneven shape, and reflects part of light and transmits the remaining light, and a second transparent substrate (20) bonded to the surface having the uneven shape of the uneven half mirror structure body with a transparent material (30) interposed between the second transparent substrate (20) and the surface having the uneven shape. One of the first transparent substrate and the second transparent substrate disposed closer to a projection side than the semitransparent reflective layer (13) is made of a material exhibiting birefringence of less than or equal to 500 nm.

(2) In the screen of the above (1), the second transparent substrate (20) is a plate-shaped glass component, and image light from the projector is projected onto the second transparent substrate (20) (see FIG. 4).

(3) In the screen of the above (1), the image light from the projector is projected onto the first transparent substrate (11) (see FIG. 5).

(4) In the screen of the above (1), the first transparent substrate (11) may be made of any one of acrylic, polycarbonate, and triacetyl cellulose.

(5) In the screen of the above (1), the first transparent substrate (11) is made of a material exhibiting birefringence of greater than 500 nm, a second transparent substrate (40) may be made of a material exhibiting birefringence of less than or equal to 500 nm. The first transparent substrate (11) is bonded to the second transparent substrate (40) with the transparent material (30) interposed between the first transparent substrate (11) and the second transparent substrate (40). The image light from the projector is projected onto the second transparent substrate (40) (see FIG. 6).

(6) In the screen of the above (1), the second transparent substrate (20) is made of any one of acrylic, polycarbonate and triacetyl cellulose.

(7) An image display system including a projector (200) that projects image light, and any one of the screens (100, 100b, 100c) of (1) through (6) on which the image light is projected.

(8) In the image display system of the above (7), the projector (200) outputs at least one of three primary colors of light as polarized light.

The embodiments have been described above as examples of the technique according to the present disclosure. For the description, the attached drawings and the detailed description have been provided.

Therefore, the components shown in the attached drawings and the detailed description may include not only components essential to solve the problem but also components which are not essential to solve the problem for illustrating the technique. Thus, it should not be immediately deemed that, merely based on the fact that the not-essential components are shown in the attached drawings and the detailed description, the not-essential components are essential.

Further, since the above-described embodiments are provided to illustrate the technique according to the present disclosure, various changes, replacements, additions, omissions, or the like can be made within the scope of the claims or of their equivalents.

In the projection image display system according to the present disclosure, projection light is incident, through a substrate that has small birefringence, on the uneven half mirror portion that diffuses and reflects the projection light. Accordingly, the projection image display system according to the present disclosure is capable of displaying a high quality image without striped unevenness, even when using a projector emitting a polarized light. It is useful as an image display device that displays an image, for example, on windows of a commercial establishment.

What is claimed is:

1. A screen that diffuses and reflects image light projected by a projector to display an image, the screen comprising:
an uneven half mirror structure body including a first transparent substrate and a semitransparent reflective layer, the first transparent substrate having an uneven shape on one surface of the first transparent substrate, the semitransparent reflective layer being provided on the surface of the uneven shape and configured to reflect a part of light and transmit the remaining light; and
a second transparent substrate bonded to the uneven half mirror structure body on the surface of the uneven shape with a transparent material,
wherein:
one of the first transparent substrate and the second transparent substrate disposed closer to a projection side than the semitransparent reflective layer is made of a material exhibiting birefringence of less than or equal to 500 nm;
the first transparent substrate is made of a material exhibiting birefringence of greater than 500 nm,
the second transparent substrate is made of a material exhibiting birefringence of less than or equal to 500 nm,
the first transparent substrate is bonded to the second transparent substrate with the transparent material, and
the image light from the projector is projected onto the second transparent substrate.

2. The screen according to claim 1, wherein the second transparent substrate is a plate-shaped glass component.

3. The screen according to claim 1, wherein the first transparent substrate is made of any one of acrylic, polycarbonate and triacetyl cellulose.

4. The screen according to claim 1, wherein the second transparent substrate is made of any one of acrylic, polycarbonate and triacetyl cellulose.

5. A projection image display system comprising:
a projector that projects image light; and
a screen according to claim 1 onto which the image light is projected.

6. The projection image display system according to claim 5, wherein the projector outputs at least one of three primary colors of light as polarized light.

7. The projection image display system according to claim 5, wherein the projector includes a light emitting element that emits blue light, a phosphor that converts the blue light into yellow light, and a color filter that separates red light and green light from the yellow light.

8. The projection image display system according to claim 5, wherein the projector includes a blue laser diode that outputs blue light and a red laser diode that outputs red light, as light sources, and a phosphor that generates green light from the blue light.

9. The projection image display system according to claim 5, wherein the projector includes a blue laser diode that outputs blue light, a red laser diode that outputs red light, and a green laser diode that outputs green light as light sources.

10. The projection image display system according to claim 5, wherein the projector includes a liquid crystal panel as a spatial modulation element, and emits each of three primary colors as polarized light.

* * * * *